UNITED STATES PATENT OFFICE.

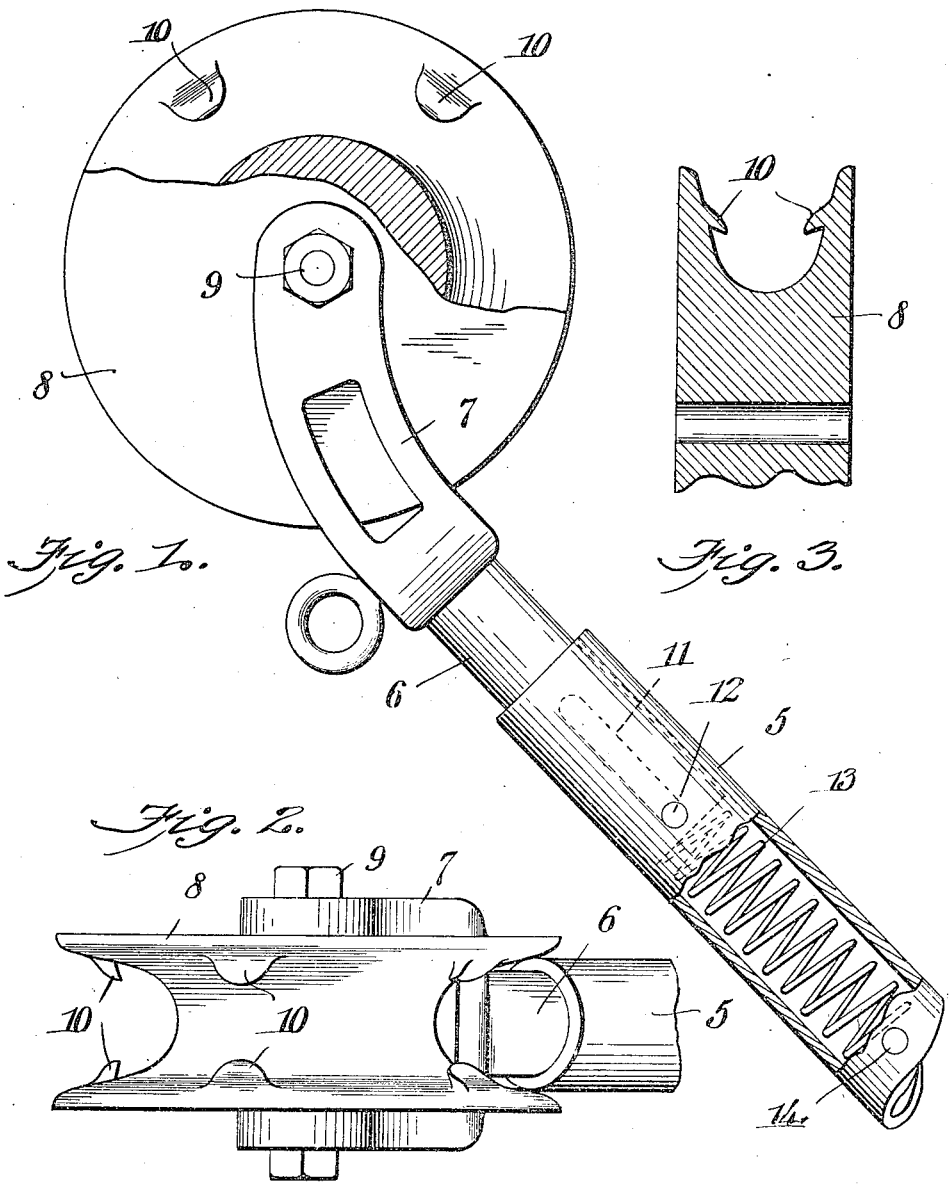

LEANUS S. ROOS, OF ROCKFORD, ILLINOIS.

TROLLEY-WHEEL.

1,288,686.

Specification of Letters Patent.   Patented Dec. 24, 1918.

Application filed August 9, 1917.   Serial No. 185,335.

*To all whom it may concern:*

Be it known that I, LEANUS S. Roos, a citizen of the United States, residing at Rockford, in the county of Winnebago and State of Illinois, have invented certain new and useful Improvements in Trolley-Wheels, of which the following is a specification.

This invention relates to trolley wheels, and aims primarily to simplify the construction and operation of devices of this character, as well as to increase the efficiency of the same.

A further object of the invention is to provide a trolley wheel of improved character which is equipped with means for preventing the same becoming accidentally detached from the trolley wire when rounding curves, or when the wheel engages obstacles or irregularities in the wire.

A further object of the invention is to provide a trolley wheel of this type which is provided with improved means for holding the wheel in proper frictional engagement with the wire, irrespective of the irregularities in the wire.

Still further objects reside in providing a trolley mechanism of the character described which shall be of extremely simple and inexpensive construction, which has its various movable parts so constructed and arranged as to minimize the opportunity for wear or breakage, which is simple and positive in operation, and which will prove thoroughly efficient and practical in use.

With these objects in view together with others which will appear as the description proceeds, the invention resides in the novel formation, combination and arrangement of parts, all as will be described more fully hereinafter, illustrated in the drawings and particularly pointed out in the claim.

In the drawing:

Figure 1 is a side elevation, parts being broken away, of a trolley constructed in accordance with the invention.

Fig. 2 is a top plan view of the wire engaging trolley wheel, and

Fig. 3 is a detail fragmental sectional view taken through the trolley wheel and illustrating the means for preventing the wheel becoming accidentally detached from the trolley wire.

Referring now particularly to the drawings, 5 indicates a conventional form of trolley pole, the same being hollow as is usual, and within the outer end of this pole telescopes the stem 6. This stem is equipped at its outer end with a yoke or fork 7, within which is rotatably mounted the trolley wire engaging wheel 8, the latter being rotatably supported upon an axle 9 connecting the outer ends of the fork or yoke 7.

The trolley wheel 8 is grooved in its periphery, as shown, the said grooved portion being adapted to receive a trolley wire, and to prevent accidental disengagement of the wheel from the wire, the said wheel is provided in its periphery with a plurality of inwardly projecting lugs 10. These lugs are formed integral with the walls defining the sides of the groove which accommodate the wire, and the lugs 10 project downwardly and inwardly toward the wire. The upper surfaces of the lugs 10 are rounded, as shown, so that the wire engaged thereby will be slid off and into the groove in the periphery of the wheel. The lugs 10 are spaced slightly beyond the bottom of the channel in the pulley, and are located preferably directly opposite each other, being spaced apart a distance sufficient to permit of the wire passing between the same.

In connection with a trolley wheel of this character, means is provided for compensating for the undulations in the trolley wire, and to this end the stem 6 is arranged so as to be capable of sliding in and out of the hollow trolley arm 5. The stem 6 is provided with an elongated slot 11, and this slot is preferably located adjacent the inner end of the said stem, being disposed longitudinally of the latter. A pin 12 extends through the pole 5 and the slot 11, the said pin being affixed to the pole. This particular pin and slot arrangement prevents the stem 6 rotating in the trolley pole 5, but permits of the said stem being moved bodily longitudinally of the pole. An expansion spring 13 bears at one end against the inner extremity of the stem 6 and is seated at its opposite end against a cross pin 14 passing laterally through the pole 5 inwardly from the outer end thereof. This expansion spring 13 thus normally forces the stem 6 and the wheel carried thereby to the limit of its outward movement, but should the wheel encounter a low hung wire, the stem 6 will telescope within the pole 5 and the spring 13 will at once be compressed. By this particular arrangement it is seen that vertical undulations in the trolley wire will be compensated for, and the spring 13 holds the trolley wheel at all times in proper contact with the wire.

From the foregoing it is obvious that I have provided an extremely simple and yet thoroughly efficient trolley mechanism, and one which will prove thoroughly practical in the attainment of the ends which it is desired to attain.

While the present is a disclosure of what is believed to be the preferred embodiment of the invention, it is to be understood that the invention is not limited thereto, as various changes in the minor details of construction, proportion and arrangement of parts may be resorted to if desired without departing from the spirit of the invention as defined by the appended claim.

What is claimed is:

In a trolley wheel, a grooved roller, the bottom of the groove in said roller being rounded and the side walls of the groove being inclined outwardly, lugs arranged in pairs upon the side walls of the groove and inwardly from the periphery of the roller, the said lugs extending a short distance into the groove and having their under faces inclined toward the center from which the bottom of the groove is struck, the said lugs being of greater thickness at their base portions than at their inner ends and the upper faces of the lugs being rounded, and the forward and rear edges of the said lugs being curved toward the inner extremities of the lugs.

In testimony whereof I affix my signature in presence of two witnesses.

LEANUS S. ROOS.

Witnesses:
CLARENCE GALLISATH,
CLAUS A. PEARSON.

Copies of this patent may be obtained for five cents each, by addressing the "Commissioner of Patents, Washington, D. C."